United States Patent
Cavallaro

(10) Patent No.: US 7,063,630 B2
(45) Date of Patent: Jun. 20, 2006

(54) LIGHTWEIGHT PERFORMANCE GOLF BALLS

(75) Inventor: Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/847,231

(22) Filed: May 17, 2004

(65) Prior Publication Data

US 2005/0255943 A1    Nov. 17, 2005

(51) Int. Cl.
    *A63B 37/06* (2006.01)
(52) U.S. Cl. .................................................. 473/374
(58) Field of Classification Search ............... 473/373, 473/374, 376, 368, 378–385
    See application file for complete search history.

(56) References Cited

U.S. PATENT DOCUMENTS

| | | | |
|---|---|---|---|
| 5,497,996 A | 3/1996 | Cadorniga | |
| 5,776,013 A * | 7/1998 | Yokota et al. | 473/377 |
| 5,807,192 A | 9/1998 | Yamagishi et al. | 473/377 |
| 5,820,492 A | 10/1998 | Yamagishi et al. | |
| 5,863,264 A | 1/1999 | Yamagishi et al. | 473/377 |
| 6,045,461 A | 4/2000 | Yamagishi et al. | |
| 6,220,972 B1 | 4/2001 | Sullivan et al. | |
| 6,299,552 B1 | 10/2001 | Morgan et al. | 473/377 |
| 6,309,314 B1 | 10/2001 | Sullivan et al. | |
| 6,315,684 B1 * | 11/2001 | Binette et al. | 473/377 |
| 6,565,457 B1 | 5/2003 | Sullivan et al. | |
| 6,729,973 B1 * | 5/2004 | Fujisawa et al. | 473/351 |
| 6,793,593 B1 * | 9/2004 | Binette et al. | 473/374 |
| 2002/0045500 A1 | 4/2002 | Fushihara | 473/378 |
| 2003/0096936 A1 * | 5/2003 | Wu et al. | 528/76 |

OTHER PUBLICATIONS

Louis G. Caschera, Jr. Strictly Golf Balls, Revised Edition, p. 16.*

* cited by examiner

*Primary Examiner*—Raeann Gordon

(57) ABSTRACT

The present invention is directed to a golf ball with a core and a cover layer surrounding the core. The golf ball preferably has a weight between about 1.45 ounces and about 1.57 ounces and the core preferably has a diameter of greater than about 1.58 inches. Thus, forming a lightweight golf ball with an oversize core. In a ball with a thermoplastic cover, the core preferably has a diameter of greater than 1.61 inches. In a ball with a thermoset cover, the core preferably has a diameter of greater than 1.58 inches. This golf ball is specifically designed to optimize its play characteristics for low swing speed players. The golf ball may further include an intermediate layer disposed between the core and the cover.

9 Claims, 1 Drawing Sheet

LIGHTWEIGHT PERFORMANCE GOLF BALLS

TECHNICAL FIELD OF INVENTION

The present invention generally relates to a lightweight golf ball including a large core for low swing speed golfers.

BACKGROUND OF THE INVENTION

The flight of a golf ball is determined by many factors, but only three factors are typically controlled by the golfer. By impacting the ball with a golf club, the golfer controls the speed, the launch angle and the spin rate of the golf ball. The launch angle sets the initial trajectory of the golf ball's flight. The speed and spin of the ball give the ball lift which will define the ball's overall flight path along with the weight and drag of the golf ball. Where the ball stops after being struck by a golf club also depends greatly on the weather and the landing surface the ball contacts.

Many golfers have what is termed a "low swing speed." This means that the club head speed at impact is relatively slow when compared to a professional golfer's. Typically, when driving a golf ball the average professional golf ball speed is approximately 234 ft/s (160 mph). A person having a low swing speed typically drives the ball at a speed less than 220 ft/s (150 mph). A person with a low swing speed has a low ball speed. Consequently, his or her ball does not fly very far because of the lack of speed and lift. A significant percentage of all golfers today use such low swing speeds and consequently produce drives of less than 210 yards.

Typically, lightweight golf balls are designed for low swing speed golfers. These lightweight golf balls usually are two-piece solid balls made with a single-solid core, encased by a hard cover material. The resiliency of the core can be increased so that the compression is high, which in addition to making the balls stiffer, increases the initial velocity and decrease the ball's spin rate. This maximizes the distance achieved by low swing speed players. However, these balls tend to have a hard feel and are difficult to control around the greens.

U.S. Pat. No. 5,807,192 to Yamagishi et al. discloses a solid golf ball with a lightweight of 40 g to 45 g (1.41 ounces to 1.59 ounces). This golf ball includes a solid core and cover. The core has a diameter of 38 mm to 40 mm (1.49 inches to 1.57 inches). This ball will offer less spin due to the smaller core diameter resulting in a less performance oriented ball.

U.S. patent application Publication No. US 2002/0045500 A1 to Fushihara discloses a light weight two-piece golf ball with a weight of 35.0 g to 41.0 g (1.23 ounces to 1.44 ounces), and preferably 38.0 g to 40.5 g (1.34 ounces to 1.42 ounces). The Fushihara publication states that when the weight of the golf ball is greater than 41.0 g, the shot feel is heavy and poor. The core has a diameter of 36.5 mm to 42.5 mm (1.44 inches to 1.67 inches), preferably 36.7 mm to 40.8 mm (1.44 inches to 1.60 inches). Since this ball is so light (e.g., less than 41.0 g), it will exhibit faster velocity. This ball, however, will be easily affected by the wind.

U.S. Pat. No. 5,863,264 to Yamagishi et al. discloses a two-piece solid golf ball with a lightweight of 41 g to 44.5 g (1.45 ounces to 1.57 ounces). The golf ball includes a solid core and cover. The core has a diameter of 37 mm to 41 mm (1.45 inches to 1.61 inches), especially 38 mm to 40 mm (1.50 inches to 1.57 inches). The Yamagishi et al. patent further discloses a thermoplastic resin cover on the core.

A need exists for a high performance golf ball designed for low swing speed players that strikes a better balance between spin rate and distance to provide a distance ball with more control around the greens.

SUMMARY OF THE INVENTION

The present invention is directed to a golf ball comprising a core having a diameter greater than 1.61 inches and a cover layer surrounding the core. In addition, the golf ball has a weight between about 1.45 ounces and about 1.57 ounces. In this embodiment, the cover layer material is not limited to thermoplastic or thermoset and either may be used.

In one preferred embodiment, the golf ball further includes a core with a Mooney viscosity of greater than about 35. More preferably, the core has a Mooney viscosity of greater than about 40. Most preferably, the core has a Mooney viscosity of 45 or greater.

According to one aspect of the present invention, the core preferably has a Shore C hardness of between about 50 and about 80. According to another aspect of the present invention, the core preferably has a compression of between about 30 and about 90.

In another preferred embodiment, the golf ball cover layer has a thickness less than or equal to about 0.060 inches. More preferably, the cover layer has a thickness less than or equal to about 0.045 inches.

In one preferred embodiment, the cover layer is formed of a thermoplastic material. In such an embodiment, the thermoplastic material is selected from the group including: partially or fully neutralized ionomers, thermoplastic polyurethane, metallocene, thermoplastic urethane, fusabond, or other single site catalyzed polymer, or blends thereof.

In another preferred embodiment, the cover layer is formed of a thermoset material. In such an embodiment, the thermoset material is selected from the group including: aromatic urethane, light stable urethane, light stable polyurea, polyurethane-ionomer or blends thereof.

Preferably, the cover layer has a flexural modulus of between about 500 and about 80,000 psi. Additionally, the cover layer preferably has a Shore D material hardness of between about 30 and about 75. Furthermore, the cover layer preferably has dimples formed in the outer surface, and the number of dimples is between about 200 and about 450.

According to one aspect of the present invention, the golf ball preferably has a compression of between about 50 and about 120. According to another aspect of the present invention, the golf ball preferably has a coefficient of restitution of greater than about 0.790 at a club speed of about 125 ft/sec.

In yet another preferred embodiment, the golf ball with a thermoset cover layer may further include an intermediate layer disposed between the core and the cover layer. The intermediate layer preferably is a moisture barrier layer.

The present invention is also directed to a golf ball comprising a core having a diameter greater than 1.58 inches and a cover layer surrounding the core. In addition, the golf ball has a weight between about 1.45 ounces and about 1.57 ounces. In this embodiment, the cover layer material is limited to thermoset material.

Preferably, this embodiment further includes an intermediate layer disposed between the core and the cover layer, where the intermediate layer is a moisture barrier layer. In such an embodiment, the moisture barrier layer may be formed of an ionomer.

Preferably, the thermoset material is selected from the group including: aromatic urethane, light stable urethane, light stable polyurea, polyurethane-ionomer or blends thereof.

DETAILED DESCRIPTION OF THE PREFERRED EMBODIMENTS

The inventor of the present invention has observed that among golf balls of maximum regulation weight of 1.62 ounces, balls having relatively large diameter cores, i.e., greater than about 1.58 inch in diameter and a thin ionomeric layer in the inner or outer cover layer exhibit longer total distance when struck at lower club speed, e.g., less than 150 mph. In one test, golf balls with large diameter cores and thin ionomeric inner or outer cover layer, such as Titleist™ Pro V1 balls and Titleist™ NXT TOUR balls, perform better in total distance than the other balls with relatively smaller cores, such as the Pinnacle™ family of balls when impacted at club speeds less than 150 mph.

In accordance with one aspect of the present invention, when golf balls with larger diameter cores and a thin ionomeric layer, as the inner or outer cover layers, are made with less weight, i.e., less than 1.62 ounces and preferably between 1.45 ounces to about 1.57 ounces, the balls fly longer when struck with lower swing speed clubs. The clubs can launch the balls on to higher flight trajectories and therefore longer distance.

Additionally, with lower overall ball compression in the range of about 50 to about 120 (Atti), the ball spin rate is sufficiently high to improve greenside play. Alternately, the outer cover can be made from a polyurethane or polyurea to improve control. Preferably when a polyurethane or polyurea material is used as the outer cover layer, a water vapor moisture barrier layer is included below the outer cover layer, as discussed below. In one example, an ionomer inner cover layer is included below the polyurethane or polyurea outer cover, similar to the Pro-V1 balls, as the moisture barrier layer.

Figure 1:
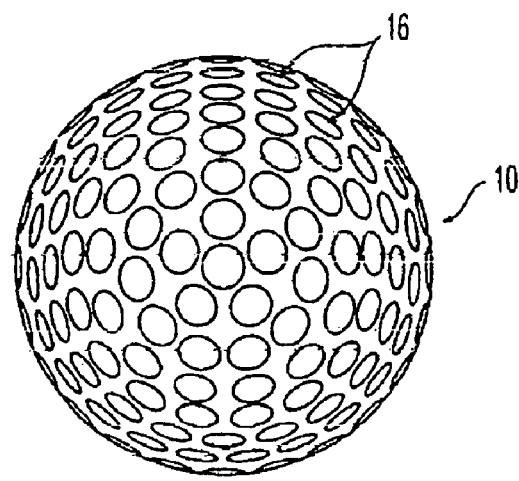
FIG. 1 is a perspective view of a first embodiment of a golf ball of the present invention.
Figure 2:
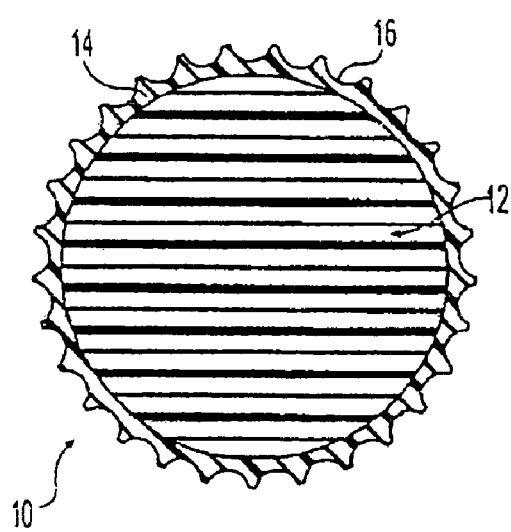
FIG. 2 is a cross-sectional view of the golf ball of FIG. 1.

Hence, a high performance ball, i.e., long distance with good greenside play, for low swing speed players is achieved, as described below. Referring to FIGS. 1 and 2, golf ball 10 comprises a core 12 and at least one cover layer 14 surrounding the core. Cover layer 14 preferably includes a plurality of dimples 16.

Preferably, core 12 has an outer diameter greater than 1.58 inches and, more preferably, ball 10 has a weight of between about 1.45 ounces and about 1.57 ounces, thereby forming a lightweight golf ball with a large core.

In addition, golf ball 10 preferably has a compression of between about 50 and about 120 Atti coefficient of restitution (CoR) at 125 ft/s of greater than 0.790, and a ball specific gravity of greater than 1.0.

As used herein, compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160-Riehle Compression).

Thus, a Riehle compression of 100 would be the same as an Atti compression of 60

CoR is the ratio of the relative velocity between two objects after direct impact to the relative velocity before impact. As a result, the CoR can vary from 0 to 1, with 1 being equivalent to a perfectly or completely elastic collision and 0 being equivalent to a perfectly plastic or completely inelastic collision. Since a ball's CoR directly influences the ball's initial velocity after club collision and travel distance, golf ball manufacturers are interested in this characteristic for designing and testing golf balls.

One conventional technique for measuring CoR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $CoR=T_{out}/T_{in}$.

Another CoR measuring method uses a titanium disk. This method is described in U.S. Pat. No. 6,688,991, and is assigned to the same assignee as the present invention. Specific gravity as used in this application is defined in terms of test ASTM D-297.

According to one aspect of the present invention the golf ball core is formulated so that the golf ball core has a compression of between about 30 and about 90. A representative base composition for forming golf ball core 12 comprises polybutadiene rubber (PBD) that has a mid to high Mooney viscosity. Preferably the core has a Mooney viscosity greater than about 35, more preferably greater than about 40, even more preferably greater than about 45, and most preferably in the range from about 50 to about 52 Mooney. PBD with higher Mooney viscosity may also be used, so long as the viscosity of the PBD does not reach a level where the high viscosity PBD clogs or otherwise adversely interferes with the manufacturing machinery. It is contemplated that PBD with viscosity less than 65 Mooney can be used with the present invention. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Golf ball cores made with mid to high Mooney viscosity PBD material exhibit increased resiliency, hence distance, without increasing the hardness of the ball. Commercial sources of suitable mid to high Mooney PBD include Bayer AG. "CB 23", which has a Mooney viscosity of about 51 and is a highly linear polybutadiene, is a preferred PBD. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are typically based on 100 parts by weight of the total elastomer mixture.

Preferably, the core has a surface hardness of between about 30 JIS C and about 90 JIS C. More preferably, the core has a surface hardness of between about 40 JIS C and about 85 JIS C. Most preferably, the core has a surface hardness of between about 50 JIS C and about 80 JIS C. Where the surface is at least 5 Shore C harder than the center of the core (as measured on the core).

In accordance to another aspect of the invention, the addition of sulfur compound to the core further increases the resiliency and the CoR of the ball. Preferred sulfur compounds include, but are not limited to, pentachlorothiophenol (PCTP) and a salt of PCTP. A preferred salt of PCTP is ZnPCTP. The utilization of PCTP and ZnPCTP in golf ball cores to produce soft and fast cores is disclosed in co-pending published U.S. application No. 2003/0064826 filed on Sep. 13, 2001, and is assigned to the same assignee as the present invention. This co-pending application is incorporated by reference herein, in its entirety. A suitable PCTP is sold by the Structol Company under the tradename A95. ZnPCTP is commercially available from EchinaChem.

Metal salt diacrylates, dimethacrylates, and monomethacrylates suitable for use in this invention include those wherein the metal is magnesium, calcium, zinc, aluminum, sodium, lithium or nickel. Zinc diacrylate (ZDA) is preferred, but the present invention is not limited thereto. ZDA provides golf balls with a high initial velocity. The ZDA can be of various grades of purity. For the purposes of this invention, lower quantity of zinc stearate in the ZDA indicates higher ZDA purity. ZDA containing less than about 10% zinc stearate is preferable. More preferable is ZDA containing about 4–8% zinc stearate. Suitable, commercially available zinc diacrylates include those from Sartomer Co. The preferred concentrations of ZDA that can be used are about 25 pph to about 40 pph based upon 100 pph of polybutadiene or alternately, polybutadiene with a mixture of other elastomers that equal 100 pph. Advantageously, the PCTP organic sulfur reacts with the ZDA used in the core to further increase the initial velocity of golf balls.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide, 1,1-di(t-butylperoxy) 3,3,5-trimethyl cyclohexane, a—a bis(t-butylperoxy) diisopropylbenzene, 2,5-dimethyl-2,5di(t-butylperoxy)hexane, or di-t-butyl peroxide, and mixtures thereof. Other useful initiators would be readily apparent to one of ordinary skill in the art without any need for experimentation. The initiator(s) at about 70% to about 100% activity are preferably added in an amount ranging between about 0.05 pph and about 2.5 pph based upon 100 parts of butadiene, or butadiene mixed with one or more other elastomers. More preferably, the amount of initiator added ranges between about 0.15 pph and about 2 pph and most preferably between about 0.25 pph and about 1.5 pph. Suitable commercially available dicumyl peroxides include Perkadox BC, which is >90% active dicumyl peroxide, and DCP 70, which is >70% active dicumyl peroxide.

As discussed above, when ZDA or another metal salt of diacrylates, dimethacrylates, and monomethacrylates are used in the core, about 1 pph to about 20 pph of zinc oxide (or a smaller amount of calcium oxide and higher amount of peroxide) is preferably added to the core composition to react and neutralize any acrylic acid that may be present. More preferably, about 1.5 pph to about 15 pph of zinc oxide is added and most preferably about 2 pph to about 10 pph of zinc oxide is added.

Antioxidants may also be included. Antioxidants are compounds, which prevent the breakdown of the elastomer. Antioxidants useful in the present invention include, but are not limited to, quinoline type antioxidants, amine type antioxidants, and phenolic type antioxidants.

Other ingredients such as accelerators, e.g., tetra methylthiuram, processing aids, processing oils, dyes and pigments, as well as other additives well known to the skilled artisan may also be used in the present invention in amounts sufficient to achieve the purpose for which they are typically used.

Preferably about 1 pph to about 25 pph of regrind may be used. Most preferably, about 5 pph to about 20 pph of regrind may be used.

Low density fillers can also be added to the core formulation. Preferably about 1 pph to about 15 pph of low density fillers may be used. Most preferably, about 5 pph to about 10 pph of low density fillers may be used. Low density fillers can be used to reduce the weight of the ball. Suitable low density fillers may include hollow spheres or microspheres that can be incorporated into the core material including, for example polybutadiene.

High density fillers can also be added to the core formulation. Preferably about 1 pph to about 15 pph of high density fillers may be used. More preferably, about 3 pph to about 12 pph of high density fillers may be used. Most preferably, about 5 pph to about 10 pph of high density fillers may be used. Depending on the weight of the core, high density fillers can be added to the cover to improve the moment of inertia of the ball. High density fillers can be used, so long as the ball has the preferred weight, discussed above. High moment of inertia balls are fully discussed in U.S. Pat. No. 6,494,795, which is incorporated herein by reference.

Suitable high density fillers may have specific gravity in the range from about 2 to about 19, and include, for example, metal (or metal alloy) powder, metal oxide, metal searates, particulates, carbonaceous materials, and the like or blends thereof. Examples of useful metal (or metal alloy) powders include, but are not limited to, bismuth powder, boron powder, brass powder, bronze powder, cobalt powder, copper powder, inconel metal powder, iron metal powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include but are not limited to zinc oxide, iron oxide, aluminum oxide, titanium dioxide, magnesium oxide, zirconium oxide, and tungsten trioxide. Examples of particulate carbonaceous materials include but are not limited to graphite and carbon black. A more preferred high density filler is tungsten, tungsten oxide or tungsten metal powder due to its particularly high specific gravity of about 19.

Examples of other useful fillers include but are not limited to graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, regrind (which is recycled uncured center material mixed and ground to 30 mesh particle size), manganese powder, and magnesium powder.

In accordance to another aspect of the present invention, minimizing the thickness of cover layer 14, can also optimize the volume of the core deformation zone. To that end, the thickness of cover layer 14 (as shown in FIG. 2) is equal to or less than about 0.060 inches. Most preferably, the thickness of the cover layer is equal to or less than 0.045 inches. The thinness of the cover layers provides more volume for the core 12, and thereby more resilient polymeric core materials can be included in the core layer. Preferred compositions and properties of the cover layers in accordance to the present invention are described below.

Preferably, the cover layer is formed as a single layer of a thermoplastic material or a thermoset material. In a ball with a thermoplastic cover, the core preferably has a diameter of greater than 1.61 inches. In a ball with a thermoset cover, the core preferably has a diameter of greater than about 1.58 inches.

Thermoplastic materials include for example, partially or fully neutralized ionomers, thermoplastic polyurethane, metallocene, thermoplastic urethane, fusabond or other single site catalyzed polymer, or blends thereof. Thermoset materials include polyurethane, polyurea, aromatic material, aliphatic material, or blends thereof. Exemplary preferable forms of such materials include aromatic urethane, light stable urethane, polyurethane-ionomer, and light stable polyurea. The cover layer can be cast or reaction-injection molded as know by those of ordinary skill in the art. If a urethane or urea cover layer is used, the ball preferably has a moisture barrier between core 12 and cover layer 14. The use of moisture barriers is described in U.S. Pat. No. 6,632,147, which is incorporated by reference herein in its entirety. As discussed above, an ionomer such as Surlyn can be included between core 12 and a urethane urea cover 14 to be the moisture barrier layer.

If the cover layer is formed of thermoplastic material, the cover layer preferably has a flexural modulus of between about 500 psi and about 80,000 psi. More preferably, the flexural modulus is between about 25,000 psi and about 80,000 psi and most preferably, the flexural modulus is between about 30,000 psi and about 70,000 psi.

If the cover layer is formed of thermoplastic material, the cover layer preferably has a flexural modulus of between about 500 psi and about 80,000 psi. More preferably, the flexural modulus is between about 25,000 psi and about 80,000 psi and most preferably, the flexural modulus is between about 30,000 psi and about 70,000 psi.

If the cover layer is formed of thermoset material, the cover layer preferably has a flexural modulus of between about 500 psi and about 80,000 psi. More preferably, the flexural modulus is between about 500 psi and about 45,000 psi and most preferably, the flexural modulus is between about 1000 psi and about 40,000 psi.

The flexural modulus is measured according to ASTM D6272-02. These tests were carried out using a 0.5 in/min crosshead speed and a 2 inch span length in the four point bending mode. Test samples were conditioned at 23° C., 50% RH for 2 weeks and the tests performed.

If the cover layer is formed of thermoplastic material, the cover layer preferably has a Shore D hardness of between about 30 and about 75. More preferably, the Shore D hardness is between about 40 and about 70, and most preferably, the Shore D hardness is between about 45 and about 68.

If the cover layer is formed of thermoset material, the cover layer preferably has a Shore D material hardness of between about 30 and about 75. More preferably, the Shore D material hardness is between about 35 and about 65, and most preferably, the Shore D material hardness is between about 40 and about 65. The Shore D material hardness is measured on the ball according to ASTM D-2240 in either button or slab form.

With respect to FIGS. 1 and 2, the cover layer 14 preferably has between about 200 and about 450 dimples 16. The core 12 and cover layer 14, as described above, are formed according to methods well known by those of ordinary skill in the art.

Figure 3:
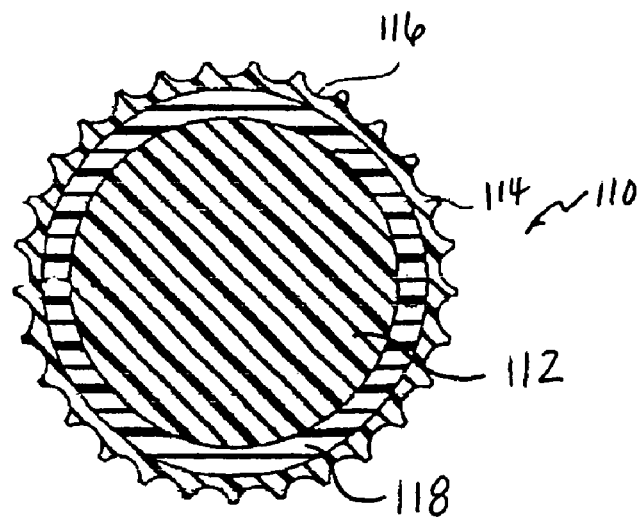
FIG. 3 is a cross-sectional view of a second embodiment of a golf ball of the present invention.

Referring to FIG. 3, the golf ball 110 is formed according to the present invention similar to golf ball 10 except it includes an intermediate layer 118 disposed between the core 112 and the cover layer 114. The ball 110, core 112 and cover 114 preferably have the characteristics of ball 10, core 12 and cover layer 18, respectively, as previously discussed. The core 112 and cover layer 114 moreover may be formed of the same materials discussed above with respect to ball 10. Preferably, the intermediate layer is formed of core materials discussed above.

While the above invention has been described with reference to certain preferred embodiments, it should be kept in mind that the scope of the present invention is not limited to these embodiments. One skilled in the art may find variations of these preferred embodiments which, nevertheless, fall within the spirit of the present invention, whose scope is defined by the claims set forth below.

What is claimed is:

1. A golf ball comprising:
   (a) a core having a diameter greater than 1.61 inches comprised essentially of a polybutadiene having a Mooney viscosity between 45 to 65, a sulfur compound, a metal salt diacrylate, a peroxide compound, regrind and weight adjusting filler;
   (b) a moisture barrier layer surrounding the core; and
   (c) a cover layer surrounding the core and moisture barrier layer, the cover layer comprised of a thermoset material having a flexural modulus between 500 psi and 45,000 psi,
   (d) wherein the golf ball has a weight between about 1.45 ounces and about 1.57 ounces.

2. The golf ball claim 1, wherein the surface of the core has a Shore C hardness of between about 50 and about 80.

3. The golf ball of claim 1, wherein the core has a compression of between about 30 and about 90.

4. The golf ball of claim 1, wherein the cover layer has a thickness less than or equal to about 0.060 inches.

5. The golf ball of claim 1, wherein the cover layer has a thickness less than or equal to about 0.045 inches.

6. The golf ball of claim 1, wherein said thermoset material is light stable polyurea.

7. The golf ball of claim 1, wherein the cover layer has dimples formed in the outer surface, and the number of dimples is between about 200 and about 450.

8. The golf ball of claim 1, wherein the golf ball has a compression of between about 50 and about 120.

9. The golf ball of claim 1, wherein the golf ball has a coefficient restitution of greater than about 0.790 at a club speed of about 125 ft/sec.

* * * * *